Dec. 19, 1922.
A. W. HAASE.
CORN SHELLER DRAG TRUCK.
FILED JAN. 23, 1922.
1,439,235
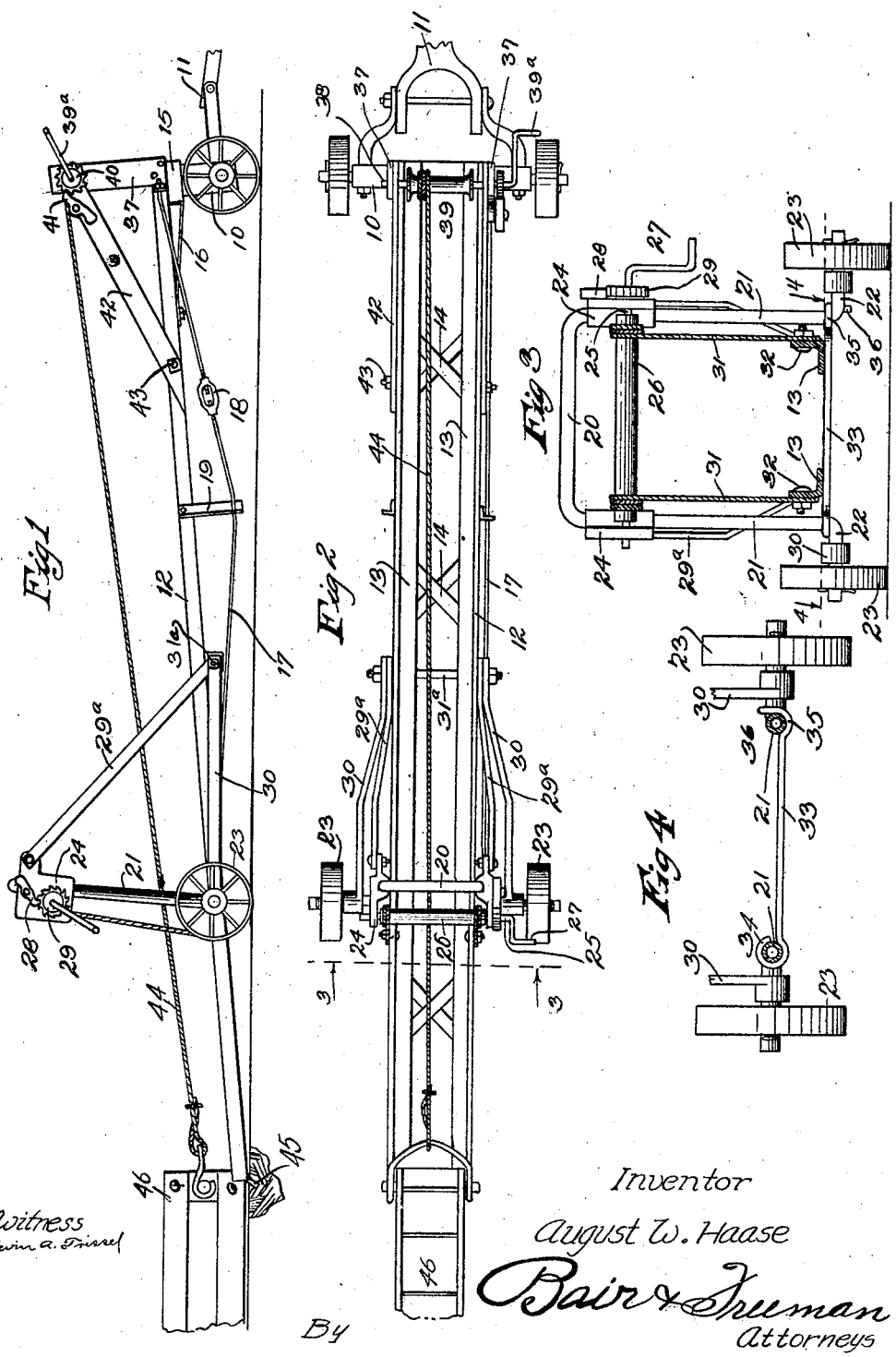
Inventor
August W. Haase
By Bair & Freeman
Attorneys
Witness
Nevin A. Trissel Patented Dec. 19, 1922.

1,439,235

UNITED STATES PATENT OFFICE.

AUGUST W. HAASE, OF FENTON, IOWA.

CORN-SHELLER-DRAG TRUCK.

Application filed January 23, 1922. Serial No. 531,199.

*To all whom it may concern:*

Be it known that I, AUGUST W. HAASE, a citizen of the United States, and a resident of Fenton, in the county of Kossuth and State of Iowa, have invented a certain new and useful Corn-Sheller-Drag Truck, of which the following is a specification.

The object of my invention is to provide a corn sheller drag truck, especially designed for conveying a corn sheller drag from place to place without the necessity of disassembling the ordinary corn sheller drag in order to transport it, the parts being of simple, durable and comparatively inexpensive construction.

More particularly, my invention relates to a truck especially designed for conveying a corn sheller drag, the supporting frame of the truck being so arranged that it may be raised and lowered, so as to form an inclined platform upon which the sheller drag may be drawn, and after the corn sheller drag has been drawn upon the supporting platform, it may be elevated and then permitted to rest on a cross bar support, whereby the entire device may then be moved from place to place as an ordinary wagon.

Still another object is to provide a corn sheller drag truck, wherein the corn sheller drag may be easily slid from the truck without any great amount of labor.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved truck, the parts being shown in their lowered position.

Figure 2 is a top plan view of the same.

Figure 3 is a sectional view taken on the line 3—3 of Figure 2, showing the elevating means for the rear end of the supporting platform; and Figure 4 is a sectional view taken on the line 4—4 of Figure 3.

In the accompanying drawings, I have used the reference numeral 10 to indicate a wheel mounted truck frame. A tongue 11 is secured to the forward end of the truck 10. I provide a supporting frame 12, which is secured to the truck frame 10 in such a manner as to permit swinging or pivotal movement of the truck frame 10 relative to the supporting frame 12.

The supporting frame 12 is composed of a pair of members 13 which are substantially the shape of an angle iron in cross section. The members 13 are connected together by reinforcing cross bars 14. A cross bar 15 is secured to the members 13 at their forward ends. The cross bar 15 rests upon the truck 10.

A reinforcing brace 16 is fastened to the member 13 and rests against the cross bar 15, as clearly shown in Figure 1 of the drawings.

It will be understood that corn sheller drags are ordinarily about thirty feet in length, and it is therefore necessary that my truck be of sufficient length to receive the entire corn sheller drag without the necessity of disassembling it.

In order to reinforce the members 13, I provide a bracing rod 17 having one of its ends fixed near the rear of the supporting frame and its other ends fixed near the front end thereof. The bracing rods 17 are provided with turnbuckles 18.

A downwardly extending member 19 is secured to the supporting frame 12 and rests upon the bracing rods 17.

In order to support the rear end of the supporting frame 12, I provide a yoke device 20, which is provided with a pair of downwardly extending lugs 21, which have their lowered ends projecting outwardly, so as to form the spindles 22. Wheels 23 are mounted on the spindles 22.

Fixed to the legs 21 near the upper ends thereof are the bearing members 24. A shaft 25 is journaled in the bearing members 24 and fixed to the shaft 25 is a drum 26. One end of the shaft 25 is provided with a crank handle 27.

Mounted on one of the bearing members 24 is a pawl 28, which coacts with a ratchet wheel 29 which is fixed on the shaft 25. Reinforcing braces 29[a] and 30 have one of their ends mounted on a bolt 31[a], which in turn is fixed to the supporting frame 12.

The free end of the brace 30 is mounted on the spindles 22, while the free end of the brace 29[a] is pivotally secured to the bearing members 24.

From the construction of the parts just described, it will be seen that the braces 29ª and 30 hold the entire yoke device 20 in upright position. Mounted on the drum 26 and extending downwardly therefrom are the flexible elements or cables 31. The flexible cables 31 have their lower ends fixed to the sides 12 by the means of bolts or the like 32.

When it is desired to raise the rear end of the supporting frame, the crank 27 is operated for causing the flexible elements 31 to be wound upon the drum 26. This causes the rear end of the supporting frame to be elevated.

In order to properly support the rear end of the supporting frame after it is in its raised position, I provide a supporting rod 33, which has one of its ends formed with a loop 34. The loop 34 extends around one of the legs 21 of the yoke device. The free end of the supporting rod 33 is provided with a curved portion 35 and then a downwardly extending portion 36.

After the supporting frame 12 has been raised, the supporting rod 33 is swung around so that the hook portions 35 and 36 rest on and extend over the opposite leg 21. The pawl 28 may then be released for permitting the rear end of the supporting frame 12 to be lowered until it rests upon the supporting rod 33.

When the frame rests upon the supporting rod 33, the parts may then be moved from place to place, similar to any ordinary wagon or truck.

At the forward end of the frame 12, I provide a pair of uprights 37, in which is journaled a shaft 38. On the shaft 38, I provide a drum 39. One end of the shaft 38 is provided with a crank handle 39ª and a ratchet wheel 40 adjacent to the crank handle.

A pawl 41 is arranged to coact with the ratchet wheel 40. Brace rods 42 extend from the upper ends of the uprights 37 diagonally downwardly and are secured to the supporting frame 12 by means of the bolts 43. A cable or flexible element 44 has one end fixed to the drum 39.

The rear end of the members 13 of the frame 12 is provided with a downwardly extending portion 45, which is received in the ground when the parts are in their inclined or lowered position, as shown in Figure 1 of the drawings.

I will now describe the practical operation of my device. The supporting frame is first lowered to the position shown in Figure 1 of the drawings. A corn sheller drag is positioned so that it rests near the rear end of the supporting frame 13.

The free end of the flexible element 44 is secured to one end of the corn sheller drag. The operation of the crank 39 will cause the cable 44 to be wound upon the drum 39. This in turn will cause the corn sheller drag, referred to by the reference numeral 46, to be drawn upon the supporting frame 12.

After the entire corn sheller drag has been positioned upon the supporting frame 12, I operate the crank 27 for raising the rear end of the supporting frame. The supporting rod 33 is then swung to position where it extends between the legs 21 of the yoke device 20.

The supporting frame is then slightly lowered, so that its rear end is entirely supported upon the supporting rod 33.

From the construction of the parts just described, it will be seen that my device may then be moved from place to place as an ordinary wagon.

When it is desired to remove the corn sheller drag from the supporting frame 12, the rear end of the supporting frame is slight raised, so as to permit the supporting rod 33 to be swung away from its operative position.

The rear end of the frame is then lowered until it rests upon the ground. The corn sheller drag 46 may then be held, while the entire device may be pulled forwardly, and thereby moved out from under the corn sheller drag 46.

It will be seen that I have provided a very efficient device for moving a corn sheller drag from place to place.

Ordinarily, it is necessary to disassemble the corn sheller drag in order to get it into an ordinary wagon. Even when disassembled, the parts are very heavy and hard to handle, and several persons are required to do the work in moving the drag from place to place.

With my improved device, it is not necessary to disassemble the corn sheller drag and one man may operate the entire device for loading and unloading the corn sheller drag 46 from the supporting frame 12.

My device is simple and a great amount of time is saved by using it for the moving of a corn sheller from place to place.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. In a device of the class described, a frame, a pair of wheels at the forward end of said frame, a second pair of wheels designed to normally support the rear end of said frame, whereby it may be moved from place to place, a yoke member arranged to extend over said frame, a drum journalled on said yoke member, flexible elements for connecting said drum with the frame, a swinging cross bar on said yoke member arranged to have the frame rest thereon, the parts being so arranged that the frame may be raised, by operating said drum, for permitting the cross bar to be swung to position where the frame may then be lowered upon the ground, all for the purposes stated.

2. In a device of the class described, a frame, a pair of wheels at the forward end of said frame, a second pair of wheels designed to normally support the rear end of said frame, whereby it may be moved from place to place, a yoke member arranged to extend over said frame, a drum journaled on said yoke member, flexible elements for connecting said drum with the frame, a swinging cross bar on said yoke member arranged to have the frame rest thereon, braces pivotally connected to said yoke and frame, the parts being so arranged that the frame may be raised, by operating said drum, for permitting the cross bar to be swung to position where the frame may then be lowered upon the ground, all for the purposes stated.

3. In a device of the class described, a frame, a pair of wheels at the forward end of said frame, a second pair of wheels designed to normally support the rear end of said frame, whereby it may be moved from place to place, a yoke member arranged to extend over said frame, a drum journaled on said yoke member flexible elements for connecting said drum with the frame, a swinging cross bar on said yoke member arranged to have the frame rest thereon, braces pivotally connected to said yoke and frame, a pair of uprights secured to the forward end of said frame, a drum journaled in said uprights and diagonally arranged braces extending from said uprights to said frame, all for the purposes stated.

4. In a device of the class described, a supporting frame, a wheel mounted truck at the forward end of said frame, a yoke device extended over said frame, a pair of wheels mounted on said yoke device, braces connected to said yoke device and said frame, a swinging bar extended from one leg of the yoke device to the other, said frame having its rear end supported by said swinging bar, a drum journaled on said yoke device above said swinging cross bar, flexible elements for connecting said drum with the frame, a ratchet and pawl device arranged adjacent to the drum, and a crank for manipulating said drum, the parts being so arranged that the rear end of the frame may be elevated and supported from said yoke device for permitting the swinging bar member to be moved to position, where it will not extend between the legs of said yoke device, and thus permitting the rear end of the supporting frame to be lowered to the ground.

5. In a device of the class described, a supporting frame, a wheel mounted truck at the forward end of said frame, a yoke device extended over said frame, a pair of wheels mounted on said yoke device, braces connected to said yoke device and said frame, a swinging bar extended from one leg of the yoke device to the other, said frame having its rear end supported by said swinging bar, a drum journaled on said yoke device above said swinging cross bar, flexible elements for connecting said drum with the frame, a ratchet and pawl device arranged adjacent to the drum, a crank for manipulating said drum, a second drum mounted near the front end of the supporting frame, a ratchet and pawl device for said second drum, and a crank for manipulating said second drum, the parts being so arranged that the rear end of the frame may be elevated and supported from said yoke device for permitting the swinging bar member to be moved to position where it will not extend between the legs of said yoke device, and thus permitting the rear end of the supporting frame to be lowered to the ground.

Des Moines, Iowa, January 10, 1922.

AUGUST W. HAASE.